United States Patent
Zhang et al.

(10) Patent No.: US 11,941,711 B2
(45) Date of Patent: Mar. 26, 2024

(54) CENTRALIZED CLOUD ENERGY STORAGE SYSTEM AND TRANSACTION SETTLEMENT METHOD THEREOF, STORAGE MEDIUM, AND TERMINAL

(71) Applicant: TSINGHUA UNIVERSITY, Beijing (CN)

(72) Inventors: Ning Zhang, Beijing (CN); Jingkun Liu, Beijing (CN); Yi Wang, Beijing (CN); Chongqing Kang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 384 days.

(21) Appl. No.: 17/190,402

(22) Filed: Mar. 3, 2021

(65) Prior Publication Data

US 2021/0192643 A1  Jun. 24, 2021

Related U.S. Application Data

(63) Continuation of application No. PCT/CN2020/074193, filed on Feb. 3, 2020.

(30) Foreign Application Priority Data

Jun. 18, 2019 (CN) .......................... 201910527424.6

(51) Int. Cl.
    *G06Q 50/06* (2012.01)
    *H02J 3/00* (2006.01)
    *H02J 3/32* (2006.01)

(52) U.S. Cl.
    CPC .............. *G06Q 50/06* (2013.01); *H02J 3/008* (2013.01); *H02J 3/32* (2013.01)

(58) Field of Classification Search
    CPC .............. G06Q 50/06; H02J 3/008; H02J 3/32
    USPC .......................................... 705/412, 7.11, 1.1
    See application file for complete search history.

(56) References Cited

U.S. PATENT DOCUMENTS

| 2012/0130556 A1* | 5/2012 | Marhoefer | G05B 15/02 700/291 |
| 2017/0005515 A1* | 1/2017 | Sanders | H02J 3/322 |
| 2018/0131049 A1 | 5/2018 | Blanyer et al. | |

FOREIGN PATENT DOCUMENTS

| CN | 107784410 A | 3/2018 | |
| CN | 108805681 A | 11/2018 | |
| CN | 109787263 A | 5/2019 | |
| CN | 109823225 A | 5/2019 | |
| CN | 110335171 A | 10/2019 | |
| DE | 102019202448 A1 * | 8/2020 | ............ B60L 53/305 |
| WO | 2016205079 A1 | 12/2016 | |

OTHER PUBLICATIONS

Chekired, Djabir Abdeldjalil, and Lyes Khoukhi. "Smart Grid Solution for Charging and Discharging Services Based on Cloud Computing Scheduling." IEEE transactions on industrial informatics 13.6 (2017): 3312-3321. Web. (Year: 2017).*

Kaur, Kuljeet et al. "Demand-Response Management Using a Fleet of Electric Vehicles: An Opportunistic-SDN-Based Edge-Cloud Framework for Smart Grids." IEEE network 33.5 (2019): 46-53. Web. (Year: 2019).*

Jingkun Liu, Ning Zhang, Chongqing Kang, Daniel S. Kirschen, Qing Xia, "Decision-Making Models for the Participants in Cloud Energy Storage", IEEE Transactions on Smart Grid, vol. 9, No. 6, Nov. 2018, pp. 5512-5521, DOI 10.1109/TSG.2017.2689239.

* cited by examiner

*Primary Examiner* — Akiba K Robinson

(57) ABSTRACT

Disclosed is a centralized cloud energy storage system for massive and distributed users and a transaction settlement method thereof, a storage medium, and a terminal. The system includes: a centralized energy storage facility invested and operated by a cloud energy storage service provider; the massive and distributed users; and a power network and a user energy management system connecting the centralized energy storage facility with the massive and distributed users. A user sends a charging and discharging request to the cloud energy storage service provider through the user energy management system, and the cloud energy storage service provider issues a charging and discharging instruction to the centralized cloud energy storage system.

8 Claims, No Drawings

CENTRALIZED CLOUD ENERGY STORAGE SYSTEM AND TRANSACTION SETTLEMENT METHOD THEREOF, STORAGE MEDIUM, AND TERMINAL

CROSS-REFERENCE TO RELATED APPLICATION

The present application is a continuation of International Application No. PCT/CN2020/074193, filed on Feb. 3, 2020, which claims priority to Chinese patent Application No. 201910527424.6, titled "CENTRALIZED CLOUD ENERGY STORAGE SYSTEM AND TRANSACTION SETTLEMENT METHOD THEREOF, STORAGE MEDIUM, AND TERMINAL", and filed by Tsinghua University on Jun. 18, 2019.

TECHNICAL FIELD

The present disclosure relates to the field of energy storage technologies of a power grid, and more particularly, to a centralized cloud energy storage system for massive and distributed users and a transaction settlement method thereof, a storage medium, and a terminal.

BACKGROUND

With the promotion of distributed power generation technologies and real-time electricity prices, users increasingly hope to invest in energy storage devices, so as to achieve the purpose of lowering electricity costs by independently choosing time of charging and discharging. Users who invest in local physical energy storage devices may face excessive unit costs, and a certain amount of energy is required for maintenance. Using shared cloud virtual energy storage to replace the local physical energy storage devices for the users is a better alternative. Cloud energy storage service providers can achieve economies of scale through large-scale investment in the construction of energy storage facilities, thereby achieving that a unit cost for the cloud energy storage service providers to invest in and construct the energy storage facilities is lower than a unit cost for distributed users to invest in and construct local physical energy storage devices by themselves. Replacing local physical energy storage for the distributed users with the cloud energy storage can significantly reduce investment and operating expenses of an overall system. Nowadays, energy and information communication technologies are increasingly deeply integrated, thereby providing hardware and software support for constructing a cloud energy storage system.

There are no relevant reports detailing the cloud energy storage system and its operation steps. How to achieve a centralized cloud energy storage system for massive and distributed users and a transaction settlement method thereof is a technical problem to be solved urgently.

SUMMARY

The present disclosure aims to solve at least one of the technical problems in the related art to some extent.

With respect to the above technical problems, the present disclosure provides a centralized cloud energy storage system for massive and distributed users and a transaction settlement method thereof, a storage medium, and a terminal.

The centralized cloud energy storage system for massive and distributed users, includes: a centralized energy storage facility invested and operated by a cloud energy storage service provider; the massive and distributed users; and a power network and a user energy management system connecting the centralized energy storage facility with the massive and distributed users. A user sends a charging and discharging request to the cloud energy storage service provider through the user energy management system. The cloud energy storage service provider issues a charging and discharging instruction to the centralized cloud energy storage system.

The centralized energy storage facility includes a combined energy storage facility including any one or more of: a lead-acid battery, a nickel-cadmium battery, a nickel chloride battery, a sodium-sulfur battery, a lithium-ion battery, a zinc-bromine battery, a flow battery, compressed air energy storage, flywheel energy storage, thermal energy storage, a zinc-air battery, supercapacitor energy storage, and superconducting magnetic energy storage.

The cloud energy storage service provider utilizes complementarity and non-simultaneity of charging and discharging requirements among the massive and distributed users to achieve energy capacity and power capacity of an energy storage facility invested and constructed by the cloud energy storage service provider being respectively lower than a sum of energy capacity requirements and a sum of power capacity requirements of all distributed users in the centralized cloud energy storage system.

A transaction settlement method includes:

providing, by the cloud energy storage service provider, the user with a cloud energy storage service, and setting, by the cloud energy storage service provider, a service fee per unit power capacity of the cloud energy storage service used by the user, a service fee per unit energy capacity, an initial state of charge of the cloud energy storage service, a minimum state of charge, a self-discharge rate, a charging efficiency, and a discharging efficiency, in a range of sets of time;

determining, by the user, to purchase the cloud energy storage service from the cloud energy storage service provider depending on his/her own actual situation to obtain a corresponding power capacity and energy capacity;

deciding, by the user on his/her own, a charging power demand and a discharging power demand in a time period of t and a power of charging using local distributed energy sources, and sending, by the user on his/her own, a request to the cloud energy storage service provider;

deciding, by the cloud energy storage service provider, a charging power and a discharging power in the time period of t of a k-th type of energy storage facility invested and operated by the cloud energy storage service provider based on information collected by the cloud energy storage service provider, and issuing, by the cloud energy storage service provider, instructions for a charging power and a discharging power to the centralized energy storage facility; and conducting, by the cloud energy storage service provider, a settlement of an operating expense with the user and the power grid.

The settlement of the operating expense includes: an electricity fee that the cloud energy storage service provider pays to the power grid when obtaining electricity from the power grid, an electricity fee paid by the power grid to the cloud energy storage service provider when power is returned to the power grid, a wheeling fee of a power transmission and distribution network that the cloud energy storage service provider pays to the power grid when carrying out the cloud energy storage service, and an electricity fee that a cloud energy storage user pays to the power grid when obtaining electricity from the power grid.

A computer-readable storage medium has a computer program instruction stored thereon. The computer program instruction is adapted to be loaded by a processor and implement the transaction settlement method.

A mobile terminal includes a processor and a memory. The processor is configured to execute a program stored in the memory to implement the transaction settlement method.

The beneficial effects of the present disclosure.

The cloud energy storage system according to the present disclosure uses cloud virtual energy storage to replace a local physical energy storage device for distributed users. The cloud virtual energy storage is physically supported by a centralized energy storage facility, and is electrically connected to the users through a power network. Users control the cloud virtual energy storage for charging and discharging operations through the user energy management system. The cloud energy storage service provider meets needs of the users by controlling charging and discharging of the centralized energy storage facility. The above features make the present disclosure have the following advantages.

Local physical space may be saved for the users and the maintenance of the local physical energy storage device is saved. The cloud energy storage service provider may achieve economies of scale through large-scale investment in the construction of the energy storage facility, and achieve that a unit cost for the cloud energy storage service provider to invest in and construct the energy storage facility being lower than a unit cost for the distributed users to invest in and construct the local physical energy storage device by themselves.

Additional aspects and advantages of the present disclosure will be given in part in the following descriptions, become apparent in part from the following descriptions, or be learned from the practice of embodiments of the present disclosure.

DESCRIPTION OF EMBODIMENTS

Embodiments will be described in detail below.

Embodiments specifically involve N=4 distributed users, constituting a set $S^{CES}$ of cloud energy storage users participating in a cloud energy storage system. Operations of the system include the following steps.

1) A cloud energy storage service provider invests in an energy storage facility and sells a cloud energy storage service to the cloud energy storage users.

1.1) A commodity sold by the cloud energy storage service provider to the energy storage users is the cloud energy storage service. A service fee $\beta^P$ of unit power capacity of the cloud energy storage service used by the cloud energy storage users within a set T of time (T includes three periods of time) is set to 420 Yuan/kW. A service fee $\beta^E$ per unit energy capacity is 1,260 Yuan/kWh. An initial state of charge $SOC_0$ of the cloud energy storage service is 0.2. A minimum state of charge $SOC^{Min}$ is 0.1. A self-discharge rate S is $10^{-8}$. A charging efficiency $\eta^C$ is 0.96. A discharging efficiency $\eta^D$ is 0.96.

1.2) A cloud energy storage user i, $i \in S^{CES}$ decides to purchase the cloud energy storage service from the cloud energy storage service provider, according to his/her own actual situation. A power capacity of the obtained cloud energy storage service is $p_i^{Cap}$ and an energy capacity is $e_i^{Cap}$.

A specific setting in this embodiment is:

$$\left(p_i^{Cap}\right) = \begin{pmatrix} 3 \\ 5 \\ 7 \\ 9 \end{pmatrix} \text{kW}, \left(e_i^{Cap}\right) = \begin{pmatrix} 1 \\ 2 \\ 3 \\ 5 \end{pmatrix} \text{kWh}.$$

1.3) One or more types of centralized energy storage facilities invested and constructed by the cloud energy storage service provider constitute a set of centralized energy storage facilities K. A power capacity of a k-th type of centralized energy storage facility is $P_k^{Cap}$, and an energy capacity is $E_k^{Cap}$, where $k \in K$. In this embodiment, a specific setting is that the cloud energy storage service provider invests in and constructs one type of centralized energy storage facility, which has a power capacity $P_k^{Cap}$ of 33 kW and an energy capacity $E_k^{Cap}$ of 11 kWh.

2) The cloud energy storage user uses the cloud energy storage service through a user energy management system.

2.1) A charging power demand $p_{i,t}^C$ and a discharging power demand $p_{i,t}^D$ in a time period of t decided by the cloud energy storage user i on his/her own, as well as a power $p_{i,t}^{C,DC}$ of charging using local distributed energy sources need to meet:

$$\begin{cases} p_{i,t}^C \cdot p_{i,t}^D = 0 \\ p_{i,t}^C, p_{i,t}^D, p_{i,t}^{C,DG} \geq 0 \\ p_{i,t}^C \leq \min\left\{p_i^{Cap}, \dfrac{e_i^{Cap} - (1-s)e_{i,t-1}}{\Delta t \eta^C}\right\} \\ p_{i,t}^D \leq \max\left\{0, \min\left\{p_i^{Cap}, \dfrac{\eta^D\left[(1-s)e_{i,t-1} - soc^{Min} \cdot e_i^{Cap}\right]}{\Delta t}\right\}\right\} \\ p_{i,t}^{C,DG} \leq \min\{p_{i,t}^{DG}, p_{i,t}^C\} \end{cases},$$

where $\Delta t$ denotes a time interval of each time period and is set to 15 minutes, $p_{i,t}^{DG}$ denotes a generation power of the local distributed energy sources of the cloud energy storage user i in the time period of t, and $e_{i,t}$ denotes an electric quantity of the cloud energy storage service of the cloud energy storage user i at the end of the time period of t.

In this embodiment, $p_{i,t}^C$, $p_{i,t}^D$ and $p_{i,t}^{C,DC}$ are specifically set as:

$$\left(p_{i,t}^C\right) = \begin{pmatrix} 1 & 0.5 & 0 \\ 2 & 0 & 1 \\ 3 & 2 & 0 \\ 5 & 4 & 0 \end{pmatrix} \text{kW}, \left(p_{i,t}^D\right) = \begin{pmatrix} 0 & 0 & 1 \\ 0 & 1 & 0 \\ 0 & 0 & 2.5 \\ 0 & 0 & 9 \end{pmatrix} \text{kW}, \left(p_{i,t}^{C,DG}\right) = \begin{pmatrix} 0 & 0 & 0 \\ 0 & 0 & 1 \\ 0 & 0 & 0 \\ 0 & 0 & 0 \end{pmatrix} \text{kW}.$$

2.2) The cloud energy storage user i sends $p_{i,t}^C$, $p_{i,t}^D$ and $p_{i,t}^{C,DC}$ to the cloud energy storage service provider through the user energy management system.

3) The cloud energy storage service provider decides and executes an operation strategy.

3.1) The cloud energy storage service provider decides, based on information collected by the cloud energy storage service provider, a charging power $P_{k,t}^C$ and a discharging power $P_{k,t}^D$ in the time period of t of the k-th type of energy storage facility that the cloud energy storage service provider invests in and operates.

In this embodiment, $P_{k,t}^C$ and $P_{k,t}^D$ are specifically set as $(P_{k,t}^C) = (11\ 5.5\ 0)$ kW and $(P_{k,t}^D) = (0\ 0\ 11.5)$ kW.

3.2) The cloud energy storage service provider issues instructions for the charging power $P_{k,t}^C$ and discharging power $P_{k,t}^D$ to the centralized energy storage facility through an energy management system of the cloud energy storage service provider.

4) The cloud energy storage service provider conducts a settlement of an operating expense with the user and a power grid.

4.1) An operating expense $C^O$ paid by the cloud energy storage service provider to the power grid may be obtained through a formula as:

$$C^O = \sum_{t \in T} \Delta t \left[ \lambda_t \left( \sum_{k \in K} P_{k,t}^C - \sum_{k \in K} P_{k,t}^D + \sum_{i \in S^{CES}} p_{i,t}^D \right)^+ + \theta_t \left( \sum_{k \in K} P_{k,t}^C - \sum_{k \in K} P_{k,t}^D + \sum_{i \in S^{CES}} p_{i,t}^D \right)^- \right] + \Delta C,$$

where $(\cdot)^+$ and $(\cdot)^-$ are respectively defined as taking a positive part and a negative part in parentheses, namely:

$$(x)^+ = \begin{cases} x, & x \geq 0 \\ 0, & x < 0 \end{cases}$$

$$(x)^- = \begin{cases} x, & x \leq 0 \\ 0, & x > 0 \end{cases}.$$

$\lambda_t$ denotes an electricity fee that the cloud energy storage service provider pays to the power grid when obtaining electricity from the power grid in the time period of t, $\theta_t$ denotes an electricity fee paid by the power grid to the cloud energy storage service provider when the cloud energy storage service provider returns power to the power grid in the time period of t, and $\Delta C$ denotes a wheeling fee of a power transmission and distribution network that the cloud energy storage service provider pays to the power grid when carrying out the cloud energy storage service.

In this embodiment, it is specifically set that $\theta_t=0$, $\Delta C=0$, and $(\lambda_t)=(1\ 1.2\ 1.5)$ Yuan/kWh, After calculation, $C^O=5.075$ Yuan.

4.2) The user pays an operating expense $c_i^{C,CES}$ to the cloud energy storage service provider, and the operating expense may be obtained through a formula as:

$$c_i^{C,CES} = \sum_{t \in T} \lambda_{i,t} (p_{i,t}^C - p_{i,t}^{C,DG}) \Delta t,$$

where $\lambda_{i,t}$ denotes an electricity fee that the cloud energy storage user pays to the power grid when obtaining electricity from the power grid during the time period of t, and may be specifically set as:

$$(\lambda_{i,t}) = \begin{pmatrix} 1 & 1.2 & 1.5 \\ 1 & 1.2 & 1.5 \\ 1 & 1.2 & 1.5 \\ 1 & 1.2 & 1.5 \end{pmatrix} Yuan/kWh.$$

After calculation, $c_i^{C,CES}$ is $$(c_i^{C,CES}) = \begin{pmatrix} 0.4 \\ 0.5 \\ 1.35 \\ 2.45 \end{pmatrix} Yuan.$$

The protection scope of the present disclosure is not limited to this embodiment, and any change or replacement that can be easily conceived by those skilled in the art within the technical scope disclosed by the present disclosure should be covered by the protection scope of the present disclosure. Therefore, the protection scope of the present disclosure should be subject to the protection scope of the attached claims.

What is claimed is:

1. A centralized cloud energy storage system for massive and distributed users, comprising: a centralized energy storage facility invested and operated by a cloud energy storage service provider; the massive and distributed users; and a power network and a user energy management system connecting the centralized energy storage facility with the massive and distributed users, wherein the centralized energy storage facility is electrically connected to each of the massive and distributed users through the power network, to replace local energy storage facilities for the distributed users, the user energy management system is communicatively connected to each of the massive and distributed users, to receive a charging and discharging request sent by the user to the cloud energy storage service provider, the user energy management system issues, based on the received charging and discharging request, a charging and discharging instruction to the centralized energy storage facility, to control the centralized energy storage facility to receive power from and supply power to the user through the power network, wherein the cloud energy storage service provider utilizes complementarity and non-simultaneity of charging and discharging requirements among the massive and distributed users to achieve energy capacity and power capacity of an energy storage facility invested and constructed by the cloud energy storage service provider being respectively lower than a sum of energy capacity requirements and a sum of power capacity requirements of all distributed users in the centralized cloud energy storage system, a charging power demand $p_{i,t}^C$ and a discharging power demand $p_{i,t}^D$ in a time period of t decided by a cloud energy storage user i on his/her own, as well as a power $p_{i,t}^{C,DG}$ of charging using local distributed energy sources need to meet:

$$\begin{cases} p_{i,t}^C \cdot p_{i,t}^D = 0 \\ p_{i,t}^C, p_{i,t}^D, p_{i,t}^{c,DG} \geq 0 \\ p_{i,t}^C \leq \min\left\{ p_i^{Cap}, \dfrac{e_i^{Cap} - (1-s)e_{i,t-1}}{\Delta t \eta^C} \right\} \\ p_{i,t}^D \leq \max\left\{ 0, \min\left\{ p_i^{Cap}, \dfrac{\eta^D[(1-s)e_{i,t-1} - SOC^{Min} \cdot e_i^{Cap}]}{\Delta t} \right\} \right\} \\ p_{i,t}^{D,DG} \leq \min\{ p_{i,t}^{DG}, p_{i,t}^C \} \end{cases}$$

where $p_i^{Cap}$ denotes a power capacity of a cloud energy storage service obtained by the cloud energy storage user i, $e_i^{Cap}$ denotes an energy capacity obtained by the cloud energy storage user i, $SOC^{Min}$ denotes a minimum state of charge, S denotes a self-discharge rate, $\eta^c$ denotes a charging efficiency, $\eta^D$ denotes a discharging efficiency, $\Delta t$ denotes a time interval of each time period, $P_{i,t}^{DG}$ denotes a generation power of the local distributed energy sources of the cloud energy storage user i in the time period of t, and $e_{i,t}$ denotes an electric quantity of the cloud energy storage service of the cloud energy storage user i at the end of the time period of t.

2. The system of claim 1, wherein the centralized energy storage facility comprises a combined energy storage facility comprising any one or more of: a lead-acid battery, a nickel-cadmium battery, a nickel chloride battery, a sodium-sulfur battery, a lithium-ion battery, a zinc-bromine battery, a flow battery, compressed air energy storage, flywheel energy storage, thermal energy storage, a zinc-air battery, supercapacitor energy storage, and superconducting magnetic energy storage.

3. A transaction settlement method based on the centralized cloud energy storage system of claim 1, comprising:
   providing, by the cloud energy storage service provider, the user with a cloud energy storage service, and setting, by the cloud energy storage service provider, a service fee per unit power capacity of the cloud energy storage service used by the user, a service fee per unit energy capacity, an initial state of charge of the cloud energy storage service, a minimum state of charge, a self-discharge rate, a charging efficiency, and a discharging efficiency, in a range of sets of time;
   determining, by the user, to purchase the cloud energy storage service from the cloud energy storage service provider depending on his/her own actual situation to obtain a corresponding power capacity and energy capacity;
   deciding, by the user on his/her own, a charging power demand and a discharging power demand in a time period of t and a power of charging using local distributed energy sources, and sending, by the user on his/her own, a request to the cloud energy storage service provider;
   deciding, by the cloud energy storage service provider, a charging power and a discharging power in the time period of t of a k-th type of energy storage facility invested and operated by the cloud energy storage service provider based on information collected by the cloud energy storage service provider, and issuing, by the cloud energy storage service provider, instructions for a charging power and a discharging power to the centralized energy storage facility; and
   conducting, by the cloud energy storage service provider, a settlement of an operating expense with the user and the power grid.

4. The transaction settlement method of claim 3, wherein the settlement of the operating expense comprises: an electricity fee that the cloud energy storage service provider pays to the power grid when obtaining electricity from the power grid, an electricity fee paid by the power grid to the cloud energy storage service provider when the cloud energy storage service provider returns power to the power grid, a wheeling fee of a power transmission and distribution network that the cloud energy storage service provider pays to the power grid when carrying out the cloud energy storage service, and an electricity fee that a cloud energy storage user pays to the power grid when obtaining electricity from the power grid.

5. A computer-readable storage medium having a computer program instruction stored thereon, the computer program instruction being adapted to be loaded by a processor and implement the transaction settlement method of claim 3.

6. A mobile terminal, comprising a processor and a memory, the processor being configured to execute a program stored in the memory to implement the transaction settlement method of claim 3.

7. The system of claim 1, wherein an operating expense $C^O$ paid by the cloud energy storage service provider to a power grid is obtained through a formula as:

$$C^O = \sum_{t \in T} \Delta t \left[ \lambda_t \left( \sum_{k \in K} P_{k,t}^C - \sum_{k \in K} P_{k,t}^D +, \sum_{i \in S^{CES}} p_{i,t}^D \right)^+ + \theta_t \left( \sum_{k \in K} P_{k,t}^C - \sum_{k \in K} P_{k,t}^D + \sum_{i \in S^{CES}} p_{i,t}^D \right)^- \right] + \Delta C,$$

where $(\cdot)^+$ and $(\cdot)^-$ respectively defined as taking a positive part and a negative part in parentheses, namely:

$$(x)^+ = \begin{cases} x, & x \geq 0 \\ 0, & x < 0 \end{cases}$$

$$(x)^- = \begin{cases} x, & x \leq 0 \\ 0, & x > 0 \end{cases}$$

T denotes a set of times, K denotes a set of centralized energy storage facilities, k denotes a k-th type of centralized energy storage facility, $S^{CES}$ denotes a set of cloud energy storage users, $\lambda_t$ denotes an electricity fee that the cloud energy storage service provider pays to the power grid when obtaining electricity from the power grid in the time period of t, $\theta_t$ denotes an electricity fee paid by the power grid to the cloud energy storage service provider when the cloud energy storage service provider returns power to the power grid in the time period of t, $P_{k,t}^C$ and $P_{k,t}^D$ respectively denote a charging power and a discharging power in the time period of t of the k-th type of energy storage facility, and $\Delta C$ denotes a wheeling fee of a power transmission and distribution network that the cloud energy storage service provider pays to the power grid when carrying out the cloud energy storage service.

8. The system of claim 1, wherein the user pays an operating expense $C_i^{C,CES}$ to the cloud energy storage service provider, and the operating expense is obtained through a formula as:

$$C_i^{C,CES} = \sum_{t \in T} \lambda_{i,t} \left( p_{i,t}^C - p_{i,t}^{C,DG} \right) \Delta t,$$

where $\lambda_{i,t}$ denotes an electricity fee that the cloud energy storage user pays to the power grid when obtaining electricity from the power grid during the time period of t, and T denotes a set of times.

* * * * *